Feb. 5, 1963  D. G. LYON  3,076,623
VARIABLE SHAPED AIRFOIL
Filed Oct. 19, 1960  4 Sheets-Sheet 3
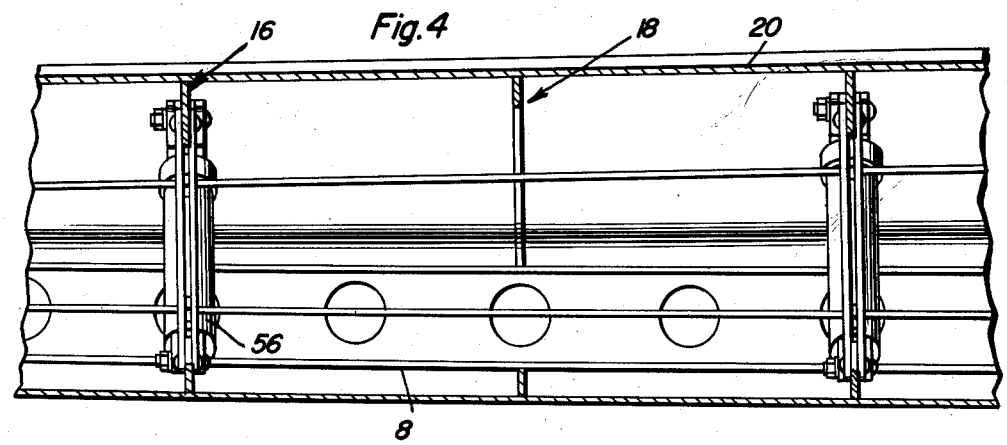
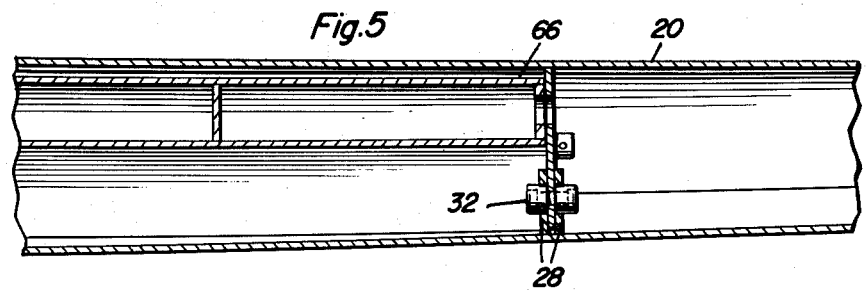
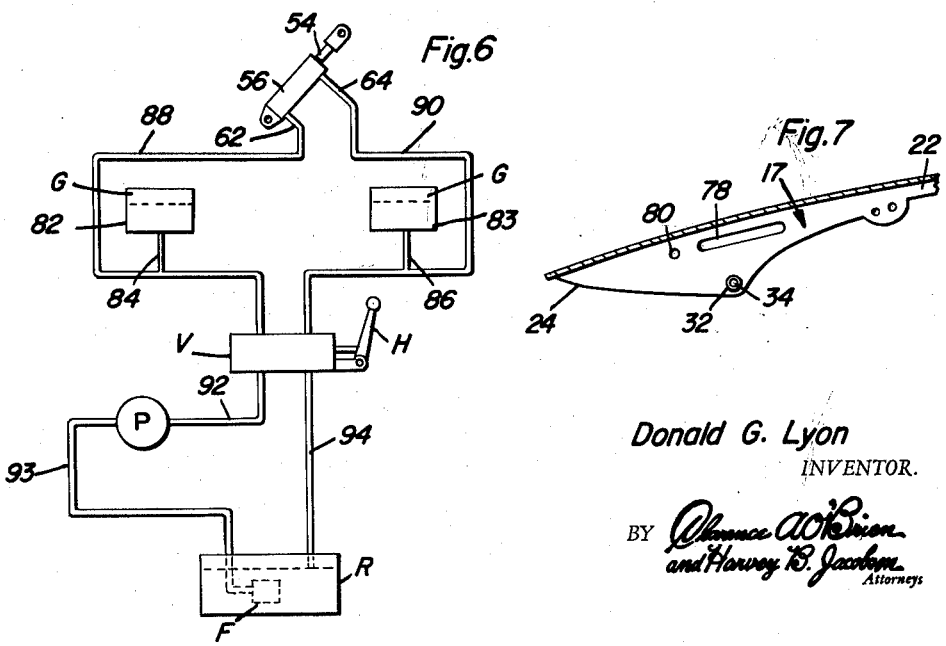
Donald G. Lyon
INVENTOR.
BY *Lawrence A. O'Brien*
*and Harvey B. Jacobson*
Attorneys

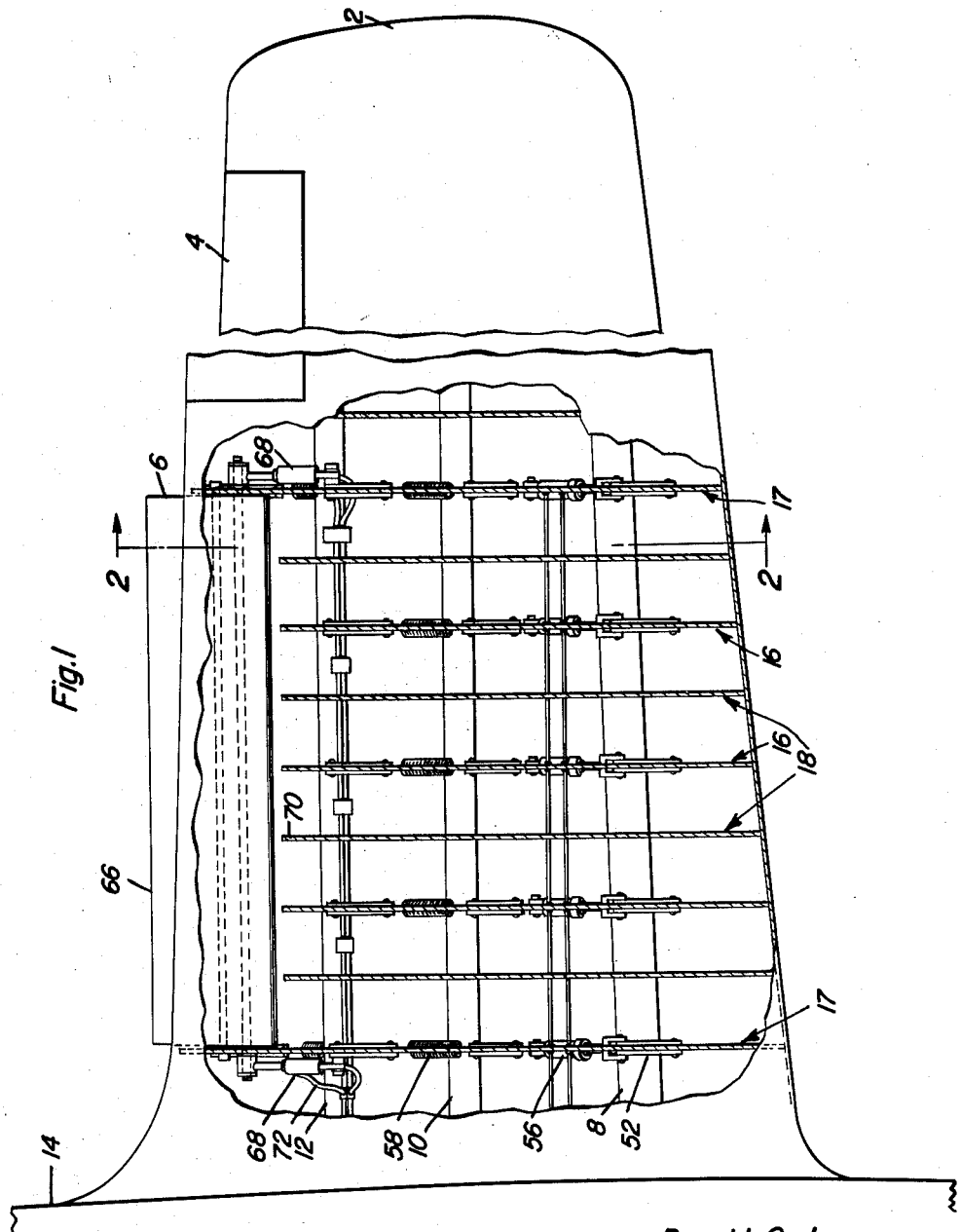

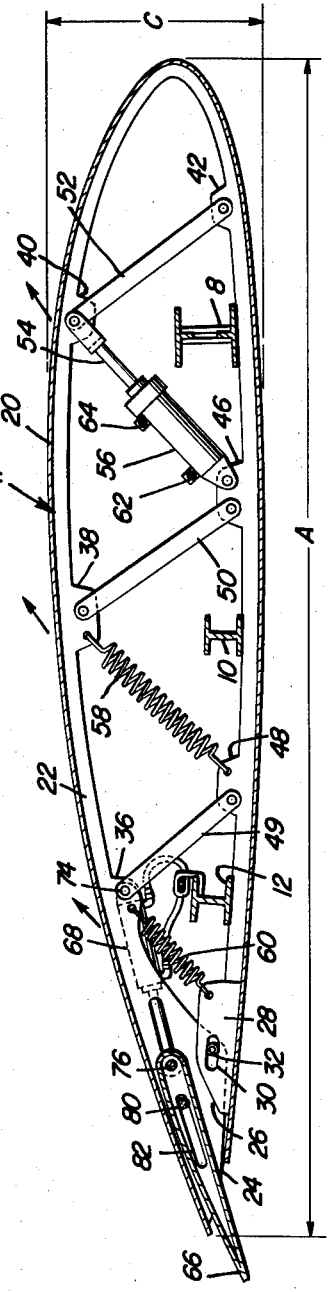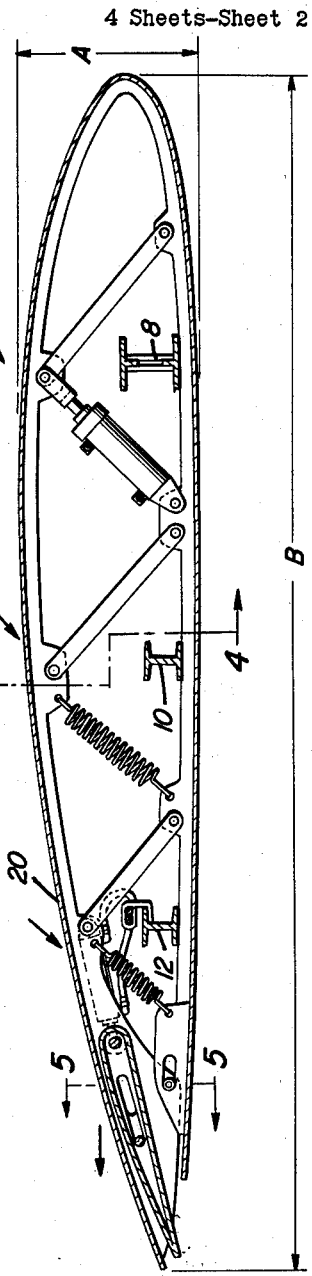
Donald G. Lyon
INVENTOR.

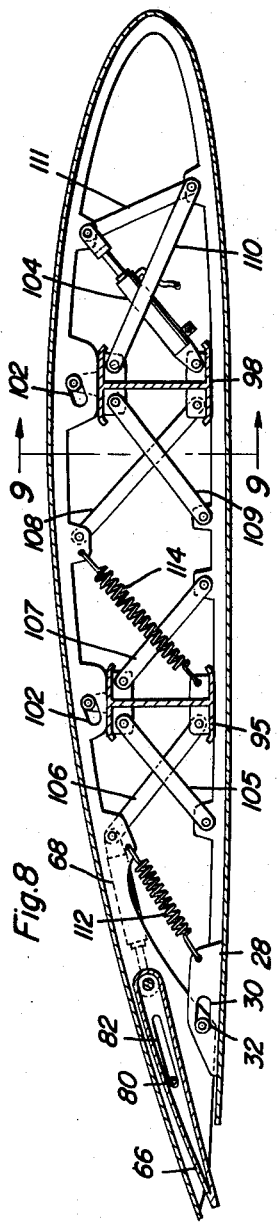

United States Patent Office 3,076,623
Patented Feb. 5, 1963

3,076,623
VARIABLE SHAPED AIRFOIL
Donald G. Lyon, Dubuque, Iowa
(310 S. Fairfax St., Alexandria, Va.)
Filed Oct. 19, 1960, Ser. No. 63,509
16 Claims. (Cl. 244—44)

This invention relates to aircraft wing structures, and an object of the invention is to provide a wing structure which is flexible and whose shape can be controlled by the pilot or other personnel in the aircraft.

More specifically, an object of the invention is to provide a flexible aircraft wing structure and means to vary the airfoil or cross sectional shape of the wing structure by remote control means in the aircraft.

Another object of my invention is to provide a flexible wing having a variable shaped airfoil wherein the wing structure is connected to shock absorbing and vibration dampening means to prevent the wing from being overstressed.

Still another object of my invention is to provide power means for changing the airfoil of an aircraft and means within the plane whereby the pilot or other plane personnel can control the power means to vary the shape of the airfoil as desired.

Airmen and scientists have long marveled at the unusual ability displayed by birds in their precise patterns of flight. Birds are able to accomplish unbelievable feats of precision and control while in flight due to the fact that they are able to change the shape of the airfoil of their wings to match the demand of a particular maneuver they are in the process of executing. Man has attempted to duplicate by mechanical means this ability of birds, but the resulting mechanisms were always unsatisfactory because they were too complicated and involved to be reliable under the exacting requirements of flight, and they were therefore impractical. It is therefore an object of this invention to provide a simple and reliable means for changing the shape of an aircraft airfoil while in flight and thereby providing improved maneuverability and flying characteristics.

My invention provides means whereby an airfoil may be changed from a shape having low lifts and low drag qualities to another shape having high lift and high drag qualities. When this is done there is a corresponding shift of a center of lift acting on the airfoil toward the leading edge of the wing. The center of lift shifts forwardly when the airfoil is changed to a shape having a higher lift because a high lift airfoil is thicker or has greater camber than a low lift airfoil. As the center of lift shifts forwardly, it increases the length of the moment arm between it and the tail surfaces and therefore provides better leverage for the controls in the empennage section of aircraft during slow air speed such as at the time of landings and take-offs. This added control comes naturally at critical moments in the flight of the aircraft, and therefore improves the safety thereof.

Another object of my invention is to provide a power operated flexible airfoil which will automatically return to the shape of maximum lift and prepare the aircraft for a safe emergency landing when the power means for altering the shape of the airfoil fails.

Still another object of my invention is to provide means whereby an aircraft may carry and take-off with a heavier load and operate at a higher speed without any increase in fuel consumption and without any increase in cost. The crew of a plane which is equipped with this invention, can shape the wings of the aircraft for maximum lift at take-off and once the plane is airborne, they can reduce the thickness of the wings to reduce the drag thereon and thereby increase the operating speed of the aircraft without an increase of fuel consumption. Therefore, a plane equipped with this invention can transport a given heavy load from one airfield to another in less time and with greater safety than can the same plane under identical conditions equipped with a fixed shaped airfoil.

Still another object of my invention is to provide means whereby the pilot of an aircraft may shape the airfoil of the wings thereof to provide maximum speed for a given weight of the aircraft and its contents. This could be very useful in the case of commercial flying aircraft where the number of passengers constantly change at each stop-over, and it would also be useful when the weight of the plane is considerably reduced because of fuel consumption.

Another object of my invention is to provide an aircraft wing having flexible surfaces which are moved by power means whereby the pilot may flex the wing surfaces to remove any formations of ice and snow forming thereon. This increases the safety of the aircraft and insures a full load carrying capacity throughout its flight.

Still another object of my invention is to provide hydraulic and pneumatic shock absorbing means built into the wings of aircraft. This reduces the shocks and stresses on the wings when the aircraft is flying through storms and turbulent air.

Yet another object of my invention is to prevent aircraft from stalling out in turns. When an aircraft is turning, the wing on the inside of the turn is travelling at a slower speed than the wing on the outside of the turn. Due to the slower speed of the webbing on the inside of the turn, it may stall out. With my invention, the pilot may increase the camber and therefore the lift of the inside wing to prevent its stalling out. The pilot may also roll and bank the aircraft by increasing the camber on one wing while decreasing the camber on the opposite wing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view, partly in section, showing a wing assembly incorporating my invention;

FIGURE 2 is an enlarged cross sectional view on the line 2—2 in FIGURE 1 and showing the airfoil in the expanded position;

FIGURE 3 is a view similar to FIGURE 2 but shows the airfoil contracted and in a position providing minimum drag and minimum lift;

FIGURE 4 shows an enlarged cross sectional view taken on the planes of line 4—4 of FIGURE 3;

FIGURE 5 shows an enlarged cross sectional view taken on the plane of line 5—5 of FIGURE 3;

FIGURE 6 shows a schematic diagram of the power operating means and the shock absorbing means for my variable shaped wing assembly;

FIGURE 7 is an enlarged cross sectional view showing in elevation with various parts removed, a portion of a trailing edge of the wing assembly;

FIGURE 8 shows a cross sectional view similar to FIGURE 2 but showing a modification of the invention;

FIGURE 9 shows an enlarged cross sectional view taken on the plane of line 9—9 of FIGURE 8; and FIGURE 10 shows an enlarged elevational view of a cam device for connecting the upper portions of the wing ribs to the upper surface of the wing spars.

As shown in FIGURE 1, the left wing 2 has pivoted to its trailing edge ailerons 4 and flaps 6 in the conventional location. The wing proper is composed of a plurality of longitudinally extending spars 8, 10 and 12 which extend the entire length of the wing and are anchored within the fuselage 14 and to the opposite wing. Extending across the wing and secured to the spars 8, 10 and 12 are a plurality of flexible wing ribs 16 and 18. Secured to the wing ribs is a skin or covering 20 for the wing.

Each rib, as best shown in FIGURES 2 and 7, comprises a continuous unitary resilient member 22 having the desired airfoil shape and having separated ends 24 and 26. The lower end 26 of the rib has secured thereto a plate 28 having an elongated bearing slot 30 therein. The upper end 24 of the rib has secured thereto a projecting pin 34 and a roller bearing 32 which rolls on the pin 34 but is secured thereto so as to prevent axial displacement of the bearing on the pin. The roller 32 fits within and rolls within the elongated slot 30.

Each rib has secured thereto or integral therewith and projecting inwardly therefrom a plurality of lugs 36, 38, 40, 42, 46 and 48. Adjacent pairs of these lugs are pivotally interconnected by substantially parallel links 49, 50 and 52 which extend diagonally across the ribs and have each of their ends pivotally connected to a lug. The lugs 38 and 48 are connected together and are resiliently urged together by a tension spring 58 which extends substantially normal to the links 49 and 50. The lugs 46 and 48 are pivotally connected together by a piston and cylinder type hydraulic motor 56, 54. The motor 56, 54 extends diagonally in a direction substantially parallel to spring 58. The lug 36 and the plate 28 is also resiliently urged together by the spring 60 which is substantially parallel to spring 58.

As shown in FIGURE 1, all of my wing ribs are comprised of flexible members 22, however, it is not necessary to apply or provide each rib with the links, springs and motor as shown in FIGURE 2. As shown in FIGURE 1, for example, I have provided only alternate ribs with connecting links and power operating means. The ribs directly in front of the flap 66 have been shortened by cutting off at 70 the upper rear portions thereof so as to provide room for the flap. The ribs 17 which overlap the end of the flap are of regular length and have fixed to the ends thereof projecting pins 34 with rollers 32 thereon as more clearly shown in FIGURES 2, 3 and 7. These pins and rollers extend through slots 82 in the ends of the flaps to serve as guide means therefor. The pin 74 on the rib 17 serves the dual function of connecting link 49 and hydraulic piston cylinder motor 68 to the rib. The piston rod of this motor 68 is pivotally connected at 76 to the forward end of the flap. As shown in FIGURE 1, two motors 68 are provided for each flap. Pin 76 which connects the forward edges of the flap to the motor 68 also extends through slot 78 in the upper rear section of rib 17 and thereby serves as additional guide means and supporting means for the flap and motor.

As shown in the schematic diagram in FIGURE 6, the section of cylinder 56 above the piston is connected to the hydraulic line 64 and the section of the cylinder below the piston is connected to hydraulic line 62. The line 62 is connected by valve V to line 92 which is the inlet line of pump P which is supplied with fluid from reservoir R by line 93. The hydraulic line 64 is connected by valve V to line 94 which has its lower end also connected to reservoir R. The intake of line 93 is supplied with a filter F for filtering out foreign particles to supply the pump P with clean fluid only. The valve V is a conventional three-way valve and is operated by handle H which may be located in the pilot's compartment. In one position of valve V the line 92 is connected to line 88 so as to supply hydraulic pressure to the lower end of cylinder 56. In another position of valve V the line 94 is connected to line 88 or the line 92 is connected to line 90 so as to supply hydraulic pressure to the upper end of cylinder 56, and in a third position of valve V both lines 88 and 90 are sealed so as to maintain hydraulic fluid in both of these lines.

Connected to lines 88 and 90 are accumulators 82 and 83 which contain gas G. The connecting lines 84 and 86 may be of a restricted size so as to dampen fluid flow between the accumulators and the motor when the valve V closes both lines 88 and 90. The pump P may be of the conventional type, and it may comprise the pump on the aircraft for supplying fluid to the accessories for operating them by power. Alternatively the pump P may be a separate pump which is used only to operate the flexible airfoil sections. In order that each side of the wing may be expanded and retracted individually, it is preferred that a separate control system for each wing be provided in the aircraft.

FIGURES 8 through 10 show an alternative or modified form of my invention. In this form, the spars 95 and 98 are larger in size and are fixed to the lower sections of the ribs. The upper surface of the spars have projecting lug supports 101 which are fixed to the upper surfaces of the spars. Fixed to the lugs 101 and projecting normally therefrom are pins 99 which have roller bearings 100 axially fixed to but rollable thereon. The upper sections of the ribs have spaced cam slots 102 which receives the roller bearings 100. For additional rigidity and strength, the rear spar 95 is rigidly connected to the lower rib section by links 105 and 107, and the forward spar 98 is rigidly connected to the lower section of the rib by links 109. The ends of these four links are connected to the ribs and spars by means of pins, bolts or rivets as shown. The hydraulic piston cylinder motor 104 is diagonally disposed and has one end connected to the lower section of spar 98 and the other end connected to the upper section or portion of the rib. The upper and lower surfaces of the wing and the upper and lower sections of the rib are pivotally connected together by diagonally disposed links 107, 108 and 111.

The trailing edge section of the modified airfoil is identical to the previously explained form shown in FIGURES 2 and 3, and has the same pin and slot connection 32—30 and the same identical means for supporting and operating the flaps 56. For reducing the weight of the aircraft, the spars 98 are provided with holes 93. The springs 112 and 114 transfer some of the lifting forces of the wing from the upper surface to the lower surface.

For take-offs and landings or to increase the load carrying capacity of the aircraft, it is necessary to increase the camber or thickness of the wing so as to provide maximum lift. When the aircraft is flying at a cruising altitude, or when it is desired to reduce the lift and drag of the wings, it is necessary to reduce the thickness or camber of the wings as much as possible. FIGURE 2 shows the shape of the airfoil when it is in its maximum lift and maximum drag position and FIGURE 3 shows the shape of the airfoil when it is in its minimum lift and minimum drag position. To obtain the maximum lift position, the pilot or some other crew member of the aircraft operates the valve V by handle H so as to connect line 92 with line 88 and connect line 90 with line 94 whereby piston rod 54 is pushed upwardly out of cylinder 56 and excess fluid is returned from the upper chamber of the cylinder to reservoir R. As the piston rod 54 is pushed upwardly and forwardly out of cylinder 56, the piston rod also pushes upwardly and forwardly the upper section of the wing, as shown by the arrows in FIGURE 2. The links 49, 50 and 52 are rotated clockwise about their lower pivot points which are fixed to the wing spars and thereby force the upper surface of the wing in the direction indicated by the arrows in FIGURE 2. As the wing moves to maximum position of lift, the piston eventually abuts against the upper end of the cylinder 56 and the thickness of the wing reaches its maximum value as indicated by the distance C in FIGURE 2 and the chord of a wing reaches its minimum value as indicated by dimension A in FIGURE 2. To operate the wing to its minimum drag and minimum lift position, the valve V is operated to connect the line 64 of motor 56 to pump pressure line 92 and to connect line 62 to exhaust line 94 whereby the motor is contracted, and as piston rod 54 moves downwardly and backwardly it pulls the upper surface of the wing downwardly and backwardly in the direction of the arrow shown in FIGURE 3 and when the piston eventually bottoms on the lower end of the cylinder, the wing is in its most streamline position and the thickness of the wing is at its smallest value as indicated by dimension A and the chord of the wing is at its maximum value as indicated by dimension B. Comparing FIGURE 3 and FIGURE 2 it can readily be seen that when the wing is in its most streamline position, the thickness of the wing indicated at A is much less than the thickness of the wing as indicated by dimension C when the wing is in its maximum lift. Also, the chord of the wings as indicated by dimensions A and B is greater when the wing is in its most streamline position.

While the airfoil of the wing is being changed by the motor 56, the roller bearing 32 which is fixed to the upper surface of the wing rolls in bearing slot 32 which is fixed to the lower surface of the wing. The bearing connection 32, while it does permit free relative horizontal movement between the upper and lower wing surfaces, fixes the surfaces together in a vertical direction and thereby prevents any relative vertical movement between these surfaces.

Once the airfoil has been operated to any desired position, the valve V is then adjusted to seal off the lower ends of lines 88 and 90, thereby sealing in the fluid in lines 88, 90 and the fluid motor. Once the fluid becomes locked or sealed within lines 88 and 90, then that portion of the fluid system above the valve V functions as a shock absorber or hydraulic vibration dampening means. When the wing is exposed to severe turbulence or severe loads, there would tend to be relative motion between the upper and lower surfaces of the wing. This causes the piston rod 54 to move within cylinder 56 and thereby pump fluid through restrictions 84 and 86 into accumulators 82 or 83 and thereby compressing the gas in one of these accumulators. As fluid is forced through the restricted lines 84 and 86, and through the lines 88 and 90, the friction and resistance to fluid flow within these passages dampens the flow of the fluid and thereby retards the relative movement between the upper and lower surfaces of the wing. When the fluid is forced into one of their accumulators, it compresses the gas G which acts as a resilient shock absorbing means and forces the wing back to its original position once the shock or unusual load is removed from the wing surface.

The flaps 66 may be partially extended as shown in FIGURE 2 or they may be fully extended or they may be fully retracted as shown in FIGURE 3 by means of hydraulic motor 68 of conventional design and controlled by conventional means. As is well known, the flaps are extended from the wing, the wing is capable of producing more lift and more drag. In some cases it may be desired to eliminate the flaps entirely since they duplicate some of the functions of my variable airfoil.

In the modified form of my invention shown in FIGURES 8 to 10, the shape of the airfoil is likewise varied by admitting fluid pressure to one end of the motor 104 in a manner similar to the way fluid pressure is admitted to the motor 56 in FIGURES 2 and 3. In this form of my invention, the upper surface of the wing is initially supported and guided in its movement by cam 102 which move on rollers 100 fixed to the wing spars. As the upper surface of the wing is moved forwardly, the cam slots 102 are positively forced upwardly by rollers 100. Since the upper surface of the wing is supported and guided not only by links 106, 108 and 110, but also supported and guided by cams 102 and rollers 100, a wing containing this form of my invention is therefore more rigid and stronger and has its airfoil shape more positively controlled than the form shown in FIGURE 2.

Since the ribs of the wing and the skin of the wing is made of some solid resilient material such as spring steel or aluminum alloy, the wing and ribs therein readily flex to any position to which they are urged.

By providing each half of the wing with a separate fluid control system of the type shown in FIGURE 6, it may be readily seen that one wing may be expanded in thickness to produce maximum lift and the other wing may be decreased in thickness to produce minimum lift. Therefore, it may be readily seen that any aircraft employing this invention may be turned and banked even when the ailerons of the wings are not functioning. This constitutes an additional safety feature.

In the event of failure of the fluid system for operating the fluid motor 56, the reduced air pressure on the upper surface of the wing will lift this surface to the maximum lift position as shown in FIGURE 2 and thereby automatically provide the aircraft with wings having high lift and high drag whereby the aircraft may thereby land at a slow speed without danger of stalling.

In normal use an aircraft using this invention will have its wings expanded in maximum thickness as shown in FIGURE 2 for take-off purposes and once the aircraft reaches cruising altitude, the wings will be reduced in camber as shown in FIGURE 3 to provide maximum speed and minimum fuel consumption. When the plane is ready to land, the wings will again be operated to the maximum lift position to provide a safe and slow speed landing.

When ice forms on the wings of an aircraft, by using my invention the pilot may break loose this ice merely by flexing the wings with the motor 56.

With certain types of airfoils, it is possible for my device to operate automatically. For example, assume that the aircraft has taken off and is still climbing at a relatively slow speed with the wings expanded to their maximum lift position. When the aircraft levels off at cruising altitude, the speed of the aircraft consequently increases and to compensate for this increase in speed and consequential increase in lift of the wing, the pilot must nose the plane down slightly to keep it in level flight and thereby decrease the angle of incidence of the wing. When the angle of incidence of a wing is reduced, the drag thereon is likewise reduced. When an aircraft using my device has the angle of incidence of the wings thereof reduced and the speed of the aircraft increased, the springs 58 and 60 will overcome the reduced suction on the upper surface of the wing and thereby automatically reduce the camber or thickness of the airfoil in making it more streamline for increasing the cruising speed of the aircraft. This condition is also aided by the fact that the increased velocity of the air striking the upper forward surface of the wing also tends to push the surface downwardly thereby reducing the camber of the wing and forcing it into its maximum streamline shape.

When the wing is thus operated automatically, the fluid control line 88 is connected to the exhaust line 94, or if desired, the motor 56 may be eliminated entirely and replaced with springs similar to the spring 58.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. An airfoil rib having a variable shape comprising a resilient member having an airfoil shape, said member having upper and lower relatively movable ends at the trailing edge thereof, connecting means preventing separation of said ends while permitting relative movement therebetween in a direction substantially parallel to the chord of the airfoil, power means connected between the upper and lower portions of the resilient member for changing the thickness of the rib.

2. An airfoil rib having a variable shape comprising a resilient, hollow, unitary member having an airfoil shape, said member having separate ends at the trailing edge thereof, connecting means preventing separation of said ends while permitting relative movement therebetween in a direction substantially parallel to the chord of the airfoil, power means connected between the upper and lower portions of the resilient member for changing the thickness of the rib, structural means in the central portion of the rib pivotally connecting said upper and lower portions.

3. A rib as recited in claim 2 wherein said structural means comprises substantially parallel links connected between said portions so as to move the entire upper portion forwardly when the thickness of said rib is increased by said power means.

4. A rib as recited in claim 3 wherein said connecting means comprises a slot in one of said portions and a pin on the other portion and extending through said slot for sliding movement therein.

5. A rib as recited in claim 4 wherein said slot is on the upper rib portion and said pin has a roller bearing thereon rotatable within said slot.

6. An airfoil rib having a variable shape comprising a resilient member having an airfoil shape, said member having separate ends at the trailing edge thereof, connecting means preventing separation of said ends while permitting relative movement therebetween in a direction substantially parallel to the chord of the airfoil, power means connected between the upper and lower portions of the resilient member for changing the thickness of the rib, structural means pivotally connecting said upper and lower portions, said structural means comprising diagonally disposed and substantially parallel links connected between said portions so as to move the entire upper portion forwardly when the thickness of said rib is increased by said power means and said power means comprises a hydraulic motor whose longitudinal axis is substantially perpendicular to the longitudinal axis of said links.

7. An airfoil rib having a variable shape comprising a resilient member having an airfoil shape, said member having separate ends at the trailing edge thereof, connecting means preventing separation of said ends while permitting relative movement therebetween in a direction substantially parallel to the chord of the airfoil, power means connected between the upper and lower portions of the resilient member for changing the thickness of the rib, structural means pivotally connecting said upper and lower portions, said structural means comprising diagonally disposed and substantially parallel links connected between said portions so as to move the entire upper portion forwardly when the thickness of said rib is increased by said power means and said power means comprises a hydraulic motor whose longitudinal axis is substantially perpendicular to the longitudinal axis of said links, and resilient tension means connected between said upper and lower portions.

8. An airfoil rib having a variable shape comprising a resilient member having an airfoil shape, said member having spaced ends at the trailing edge thereof, connecting means preventing separation of said ends while permitting relative movement therebetween in a direction substantially parallel to the chord of the airfoil, power means connected between the upper and lower portions of the resilient member for changing the thickness of the rib, structural means pivotally connecting said upper and lower portions, said structural means comprising diagonal links pivotally connected at opposite ends to said portions and pins on one of said portions slidable in cam slots on said other portion, said cam slots extending generally chordwise of the rib.

9. A plurality of ribs as defined in claim 1 spaced in parallel relationship, at least one wing spar connected to the lower portion of each rib whereby said lower portions are made substantially rigid, said power means being diagonally disposed so as to urge the central upper portion of the ribs forwardly and upwardly and a flexible skin covering said ribs to form a wing surface.

10. A wing comprising a plurality of spaced ribs having flexible upper and lower portions joined at the leading edge, a plurality of spaced spars rigidly connected to the lower portions, cam slots in the upper portions, bearing pins mounted on the upper side of the spars and extending into said cam slots and power means connecting said upper and lower portions and extending substantially parallel to the cam surfaces of said cam slots.

11. A wing as defined in claim 10 including links also connecting said portions and extending substantially normal to said cam slots.

12. A wing as defined in claim 11 including pin and slot means connecting the trailing ends of said ribs.

13. A wing as defined in claim 10 wherein said bearing pins and power means are provided on alternate ribs only.

14. A wing comprising a plurality of spaced ribs each having a flexible upper portion connected to a rigid lower portion at their leading edges, the trailing edges of said portions being separated and connected together by means permitting said portions to move only in a direction generally chordwise of the wing, a unitary continuous skin covering said wing connected to said ribs, resilient means urging the upper and lower portions together whereby said wing will automatically become thinner and more streamlined as the air forces tending to expand said wing are reduced.

15. A device as recited in claim 14 wherein said upper and lower portions are further connected by diagonal links pivoted thereto.

16. A wing comprising a plurality of spaced ribs having flexible upper and lower portions joined at the leading edge of the wing, a plurality of spaced spars extending generally longitudinally of the wing and secured to the lower portions of each rib, means connecting the spars to the upper portions comprising bearing pins extending into cam slots, said cam slots sloping upwardly and forwardly in relation to the chord of the wing, power means connecting said upper and lower portions, said power means being extensible and contractable in a direction generally parallel to said slots.

References Cited in the file of this patent

UNITED STATES PATENTS

| 1,747,637 | Larsen | Feb. 18, 1930 |
| 2,650,047 | Carhart | Aug. 25, 1953 |

FOREIGN PATENTS

| 271,111 | Germany | Nov. 10, 1910 |
| 209,031 | Great Britain | Dec. 19, 1924 |
| 279,904 | Italy | Nov. 25, 1930 |